US011860357B2

(12) United States Patent
Oda et al.

(10) Patent No.: US 11,860,357 B2
(45) Date of Patent: Jan. 2, 2024

(54) METHOD FOR MANUFACTURING OPTICAL SCANNING SYSTEMS

(71) Applicant: NALUX CO., LTD., Osaka (JP)

(72) Inventors: Jumpei Oda, Osaka (JP); Tomohito Kuwagaito, Osaka (JP)

(73) Assignee: NALUX CO., LTD., Osaka (JP)

( * ) Notice: Subject to any disclaimer, the term of this patent is extended or adjusted under 35 U.S.C. 154(b) by 104 days.

(21) Appl. No.: 17/667,005

(22) Filed: Feb. 8, 2022

(65) Prior Publication Data
US 2022/0163793 A1 May 26, 2022

Related U.S. Application Data

(63) Continuation of application No. PCT/JP2020/016439, filed on Apr. 14, 2020.
(Continued)

(51) Int. Cl.
*G02B 27/00* (2006.01)
*G02B 26/12* (2006.01)
(Continued)

(52) U.S. Cl.
CPC .......... *G02B 27/0012* (2013.01); *G02B 7/04* (2013.01); *G02B 26/12* (2013.01); *H04N 1/113* (2013.01); *B41J 2/471* (2013.01)

(58) Field of Classification Search
CPC ...... G02B 27/0012; G02B 7/04; G02B 26/12; G02B 26/125; H04N 1/113; B41J 2/471
See application file for complete search history.

(56) References Cited

U.S. PATENT DOCUMENTS 2,844,648 A * 7/1958 Rosenthal ................ H04N 3/08
358/487
5,861,977 A * 1/1999 Harrigan .................. G02B 5/09
347/261
(Continued)

FOREIGN PATENT DOCUMENTS

JP 04-318807 A 11/1992
JP 10-10445 A 1/1998
(Continued)

OTHER PUBLICATIONS

International Search Report and Written Opinion dated Jul. 21, 2020 corresponding to International Patent Application No. PCT/JP2020/016439, and partial English translation thereof.

*Primary Examiner* — Rick K Chang
(74) *Attorney, Agent, or Firm* — SQUIRE PATTON BOGGS (US) LLP

(57) ABSTRACT

A method for manufacturing optical scanning systems by which plural optical scanning systems with different effective scanning widths can be manufactured by changing a polygon mirror alone is provided. The method includes the steps of designing a first scanning optical system using a first polygon mirror corresponding to a first value of effective scanning width; designing a second scanning optical system provided with a second polygon mirror corresponding to a second value of effective scanning width, the second value being smaller than the first value, wherein a reference point of deflection is located at the position of the reference point of deflection of the first scanning optical system; and adjusting a size and a position of the scanning lens so as to adjust a lateral magnification in a cross section in the sub-scanning direction of the imaging optical system.

5 Claims, 5 Drawing Sheets

Related U.S. Application Data

(60) Provisional application No. 62/893,299, filed on Aug. 29, 2019.

(51) Int. Cl.
*H04N 1/113* (2006.01)
*G02B 7/04* (2021.01)
*B41J 2/47* (2006.01)

(56) References Cited

U.S. PATENT DOCUMENTS

| | | | |
|---|---|---|---|
| 5,867,298 A * | 2/1999 | Harrigan | H04N 1/0402 347/261 |
| 2010/0245958 A1 | 9/2010 | Wang et al. | |

FOREIGN PATENT DOCUMENTS

| | | |
|---|---|---|
| JP | 2006-326901 A | 12/2006 |
| JP | 2017-09910 A | 1/2017 |

* cited by examiner

METHOD FOR MANUFACTURING OPTICAL SCANNING SYSTEMS

CROSS REFERENCE TO RELATED APPLICATION

This is a Continuation of International Patent Application No. PCT/JP2020/016439 filed Apr. 14, 2020, which designates the U.S., and which claims priority from U.S. Provisional Patent Application No. 62/893,299, dated Aug. 29, 2019. The contents of these applications are hereby incorporated by reference.

TECHNICAL FIELD

The present invention relates to a method for manufacturing optical scanning systems.

BACKGROUND ART

In order to respond to requests for downsizing and reduction of costs of printers and multifunctional copiers, a scanning optical system with a single scanning lens has been developed (for example Patent document 1, JPH1010445A). Further, if plural optical scanning systems with different effective scanning widths, each of the systems using a single scanning lens, can be manufactured with optical systems for receiving light of the same type and imaging optical systems of the same type and polygon mirrors alone of different types, it is advantageous from the view point of costs, because scanning lenses of the same type can be used for the plural optical scanning systems with different effective scanning widths. Accordingly, there is a need for a method for manufacturing optical scanning systems by which plural optical scanning systems with different effective scanning widths can be manufactured with optical systems for receiving light of the same type and imaging optical systems of the same type and polygon mirrors alone of different types.

PRIOR ART DOCUMENT

Patent Document

Patent document 1; JPH1010445A

The object of the present invention is to provide a method for manufacturing optical scanning systems by which plural optical scanning systems with different effective scanning widths can be manufactured with optical systems for receiving light of the same type and imaging optical systems of the same type and polygon mirrors alone of different types.

SUMMARY OF THE INVENTION

By a method for manufacturing scanning optical systems according to the present invention, scanning optical systems with different effective scanning widths can be obtained by changing a polygon mirror alone without changing an imaging optical system including a scanning lens and an optical system for receiving light. The method includes the steps of designing a first scanning optical system using a first polygon mirror corresponding to a first value of effective scanning width; designing a second scanning optical system provided with a second polygon mirror corresponding to a second value of effective scanning width, the second value being smaller than the first value, wherein a reference point of deflection is located at the position of the reference point of deflection of the first scanning optical system, the reference point of deflection being a point of reflection on a reflecting surface of a ray of light when an angle of deflection of the reflected ray is 0; and adjusting a size and a position of the scanning lens so as to adjust a lateral magnification in a cross section in the sub-scanning direction of the imaging optical system.

According to the method for manufacturing scanning optical systems according to the present invention, plural optical scanning systems with different effective scanning widths can be manufactured with optical systems for receiving light of the same type and imaging optical systems of the same type and polygon mirrors of different types.

In the method for manufacturing scanning optical systems according to a first embodiment of the present invention, in the step of designing the second scanning optical system, the center of the second polygon mirror is located on a straight line that is perpendicular to a reflecting surface of the first polygon mirror when the angle of deflection is 0 and that passes through the center of the first polygon mirror.

According to the present embodiment, the position of the center of the second polygon mirror can be uniquely determined.

In the method for manufacturing scanning optical systems according to a second embodiment of the present invention, the relationships $$0.75 \leq f/W1 \leq 0.85 \tag{1}$$

$$0.75 \leq f/W2 \leq 0.85 \tag{2}$$

$$0.7 \leq \phi 2/\phi 1 \leq 0.8 \tag{3}$$

and $$2.4 \leq \beta \leq 3.2 \tag{4}$$

hold, where f represents a system focal length, W1 represents the first value, W2 represents the second value, $\phi 1$ represents the diameter of the inscribed circle of the first polygon mirror, $\phi 2$ represents the diameter of the inscribed circle of the second polygon mirror, and $\beta$ represents the lateral magnification in a cross section in the sub-scanning direction of the imaging optical system.

Concerning Expression (1) and Expression (2), if the ratio of the system focal length to the effective scanning width is smaller than 0.75, a high-speed printing capability cannot be obtained. Further, if the ratio of the system focal length to the effective scanning width is greater than 0.85, an imaging performance is so sensitive to the shape in a cross section in the sub-scanning direction of the scanning lens that a stable production yield cannot be expected.

Concerning Expression (3), if the ratio of the diameter of the inscribed circle of the second polygon mirror to the diameter of the inscribed circle of the first polygon mirror is less than 0.7, a shift of the point of reflection of the second polygon mirror with respect to the point of reflection of the first polygon mirror is so great that the change in curvature of field can hardly be lowered.

Concerning Expression (4), if the lateral magnification in a cross section in the sub-scanning direction of the imaging optical system is smaller than 2.4, a distance from the image point of the optical system for receiving light to the scanning point should be increased, and the scanning lens is upsized so that the manufacturing costs increase. If the lateral magnification in a cross section in the sub-scanning direction of the imaging optical system is greater than 3.2, a difference in curvature of field between the first optical scanning system and the second optical scanning system is so great that an amount of curvature of field of the second optical scanning system cannot be lowered.

In the method for manufacturing scanning optical systems according to a third embodiment of the present invention, in the step made to adjust the lateral magnification in a cross section in the sub-scanning direction of the imaging optical system, the lateral magnification is adjusted such that the relationship $$0 \leq |\Delta D| \leq 4.35 \text{ mm} \tag{5}$$

holds, where $$|\Delta D|$$

represents the maximum absolute value of difference between an amount of curvature of field of the first optical scanning system in a cross section in the sub-scanning direction and an amount of curvature of field of the second optical scanning system in a cross section in the sub-scanning direction.

According to the present embodiment, an amount of curvature of field of the second optical scanning system can be kept within a range that is acceptable for practical uses.

In the method for manufacturing scanning optical systems according to a fourth embodiment of the present invention, the relationship $$300 \text{ mm} \leq W2 \tag{6}$$

holds.

According to the present embodiment, optical scanning systems for A3 size can be manufactured.

DESCRIPTION OF EMBODIMENTS

Figure 1:
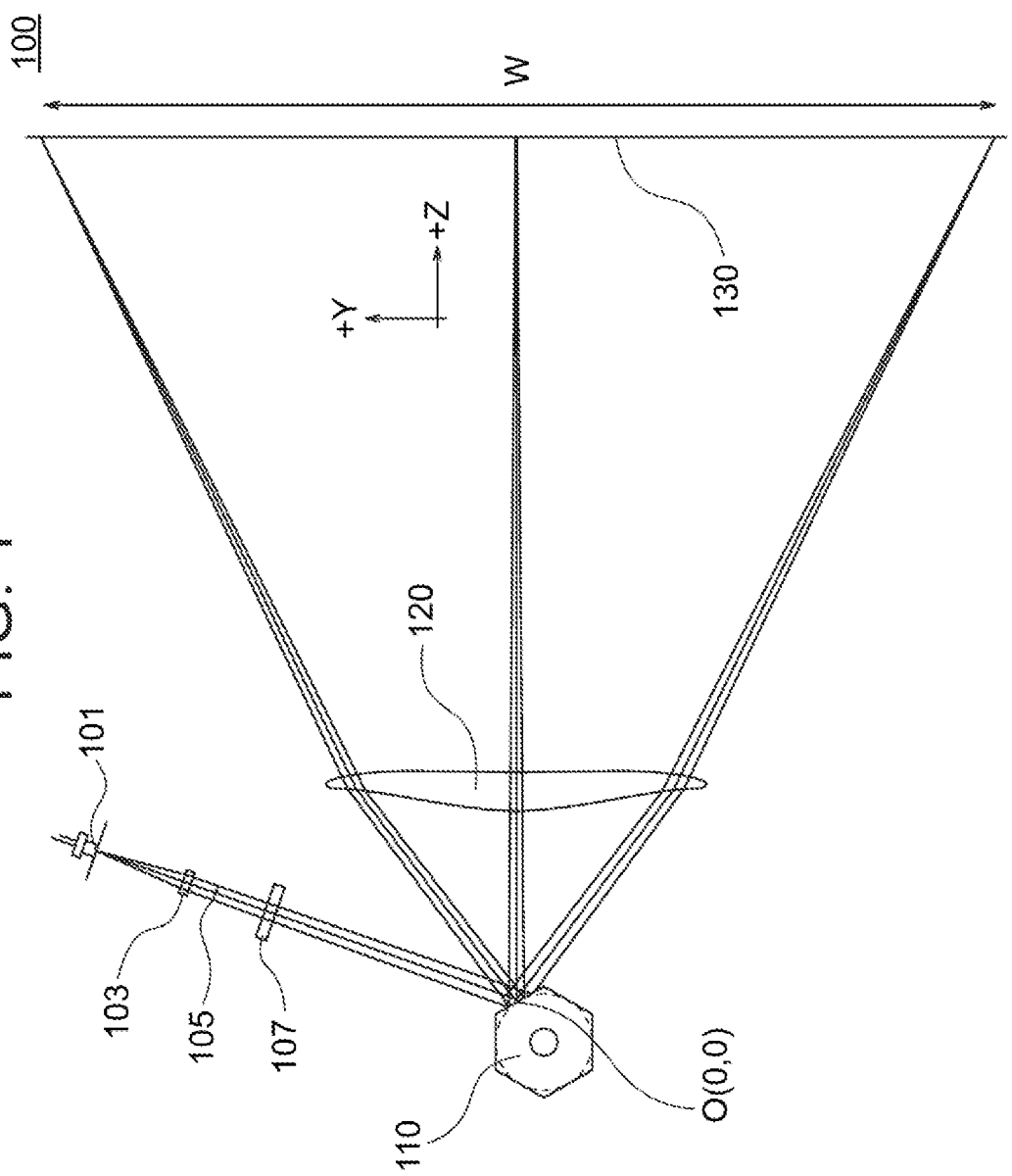
FIG. 1 shows an optical scanning system according to an embodiment of the present invention.

FIG. 1 shows an optical scanning system 100 according to an embodiment of the present invention. In FIG. 1, a y-axis in the main-scanning direction, an x-axis in the sub-scanning direction and a z-axis that is perpendicular to the x-axis in the sub-scanning direction and the y-axis in the main-scanning direction are determined. FIG. 1 shows a cross section parallel to the plane that is formed by the y-axis and the z-axis. The x-axis that is not shown in the drawing is in the direction perpendicular to the surface of the sheet. The xyz-coordinate system has the origin at a reference point of deflection, which will be described later. The optical scanning system 100 includes an optical system for receiving light, a deflector and an imaging optical system. The optical system for receiving light includes a light source 101, a collimator lens 103, an aperture stop 105 and a cylindrical lens 107. The deflector is a polygon mirror 110. The imaging optical system includes a single scanning lens 120. In the present embodiment, the light source 101 is a laser diode. A light beam emitted by the light source 101 is converted into a parallel light beam by the collimator lens 103. The diameter of the parallel light beam is controlled when passing through the aperture stop 105. Thereafter the light beam passes through the cylindrical lens 107, which has a power in the x-axis direction alone, and then forms a linear image in the vicinity of a reflecting surface of the polygon mirror 110 and on a plane that is parallel to the plane formed by the y-axis and the z-axis. Thereafter the light beam is deflected by a reflecting surface of the polygon mirror 110 and forms an image point on a scanned surface 130 after having passed through the scanning lens 120. As the polygon mirror 110 rotates, the main-scanning in the y-axis direction is performed on the scanned surface 130. In FIG. 1, W represents an effective scanning width, and the point marked with O represents a reference point of deflection. The reference point of deflection is the point of reflection of the light beam that is normally incident onto the scanned surface 130 after having been deflected by the polygon mirror 110. In this case, the light beam that has been deflected by the polygon mirror 110 travels in the z-axis direction. In general, an angle (an acute angle) that the direction of the light beam deflected by the polygon mirror 110 forms with the z-axis is referred to as an angle of deflection. The sign of an angle of deflection is defined to be positive when a light beam deflected by the polygon mirror 110 reaches an area on the scanned surface 130 where a y-coordinate is positive and defined to be negative when the light beam reaches an area on the scanned surface 130 where a y-coordinate is negative. When a light beam deflected by the polygon mirror 110 is normally incident onto the scanned surface 130, the angle of deflection is 0. When an angle of deflection is represented by θ and a y-coordinate of an image point on the scanned surface 130 is represented by Y, the relationship Y=fθ holds. f is a constant. The constant f is referred to as a system focal length.

Figure 2:
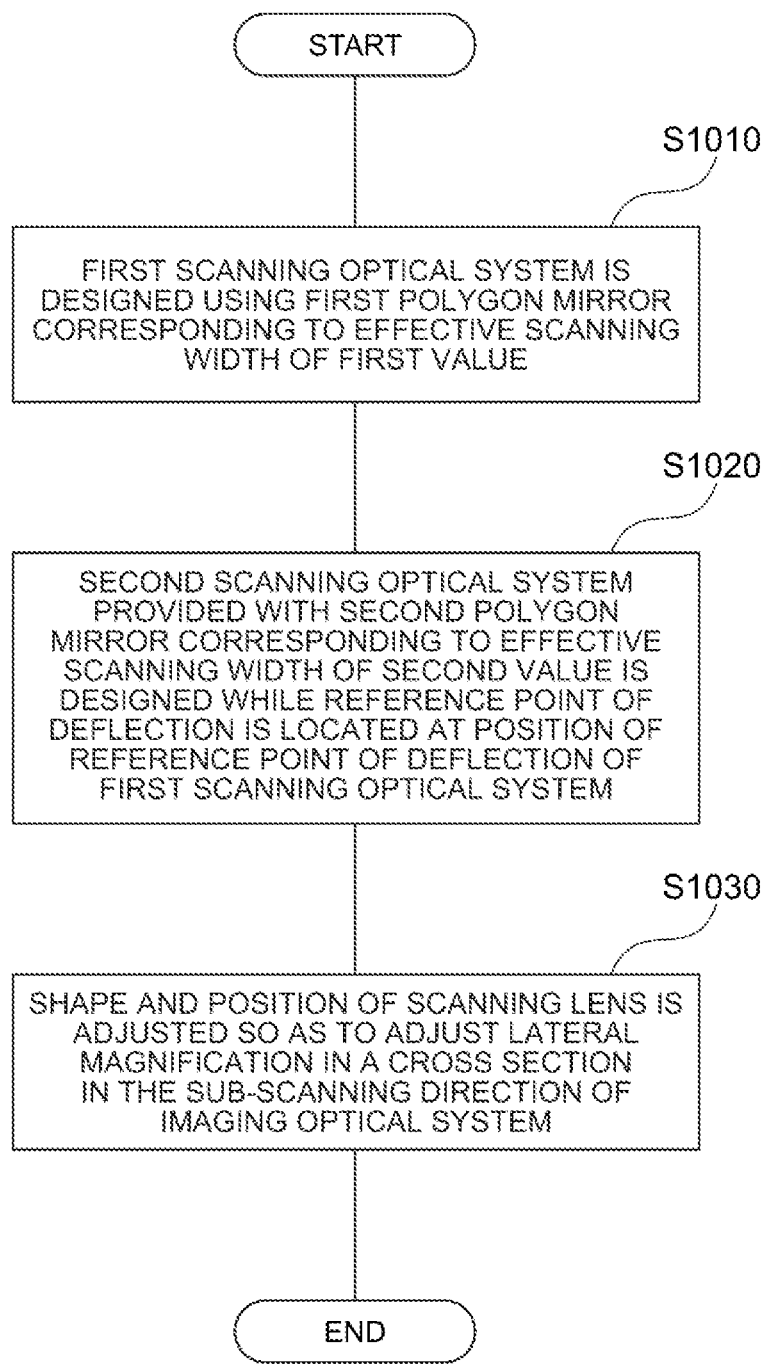
FIG. 2 is a flow chart for describing a manufacturing method of scanning optical systems according to an embodiment of the present invention.

FIG. 2 is a flow chart for describing a manufacturing method of scanning optical systems according to an embodiment of the present invention.

In step S1010 of FIG. 2, a first optical scanning system is designed using a first polygon mirror corresponding to an effective scanning width of a first value. The first optical scanning system is configured such that a distance between the point at which the minimum spot diameter is formed and the scanned surface should be 0.5 millimeters or less for any angle of deflection within the effective scanning width. In other words, the first optical scanning system is configured such that curvature of field is substantially negligible.

In step S1020 of FIG. 2, a second optical scanning system provided with a second polygon mirror corresponding to an effective scanning width of a second value that is smaller than the first value is designed. The reference point of deflection of the second optical scanning system is located at the position of the reference point of deflection of the first optical scanning system.

Figure 3:
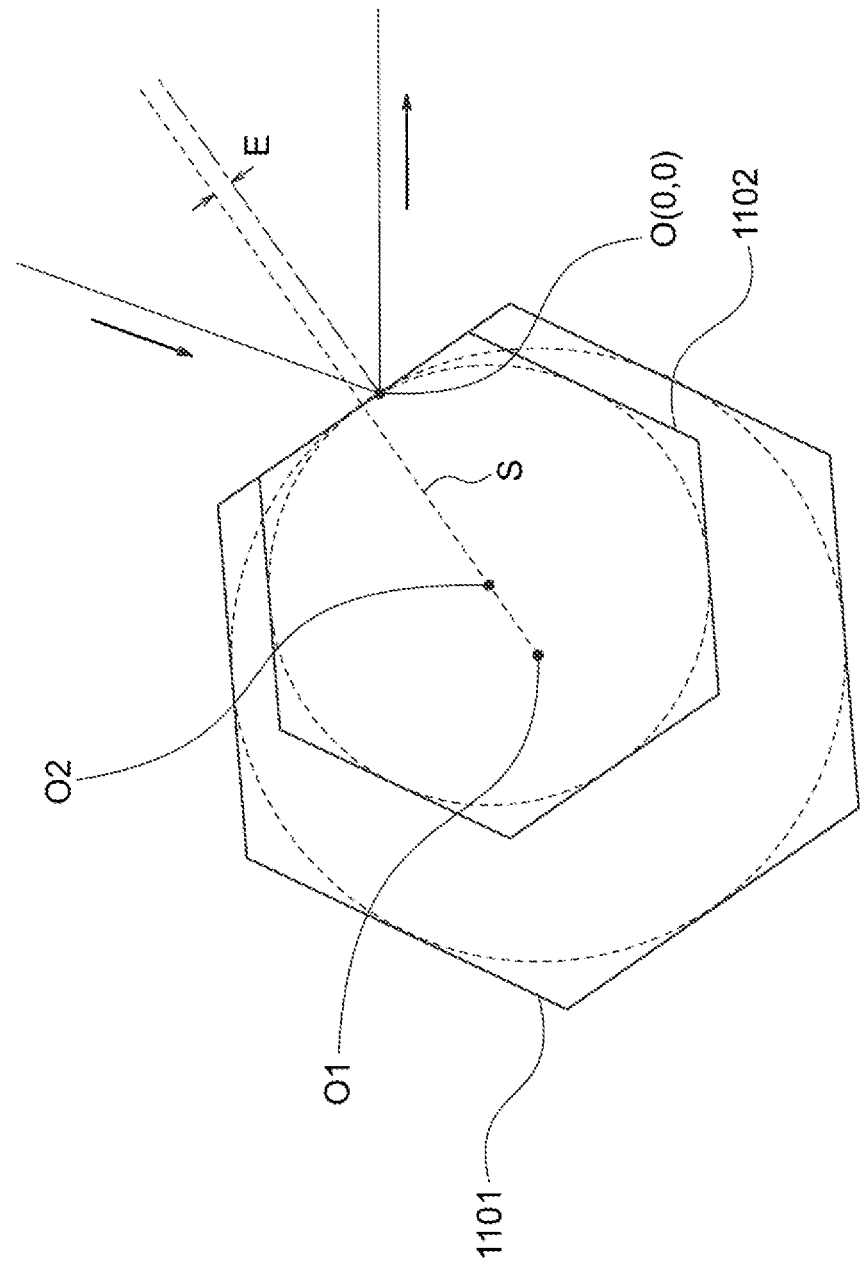
FIG. 3 illustrates a positional relationship between the first polygon mirror and the second polygon mirror.

FIG. 3 illustrates a positional relationship between the first polygon mirror and the second polygon mirror. FIG. 3 shows the first polygon mirror 1101 corresponding to the effective scanning width of the first value and the second polygon mirror 1102 corresponding to the effective scanning width of the second value that is smaller than the first value. The position of the reference point of deflection of the first optical scanning system and the position of the reference point of deflection of the second optical scanning system agree with each other. The center of rotation O1 of the first polygon mirror 1101 and the center of rotation O2 of the second polygon mirror 1102 lie on a straight line S that is perpendicular to a reflecting surface of a polygon mirror when the angle of deflection is 0 and that is at a distance of E from the reference point of deflection O.

Figure 4:
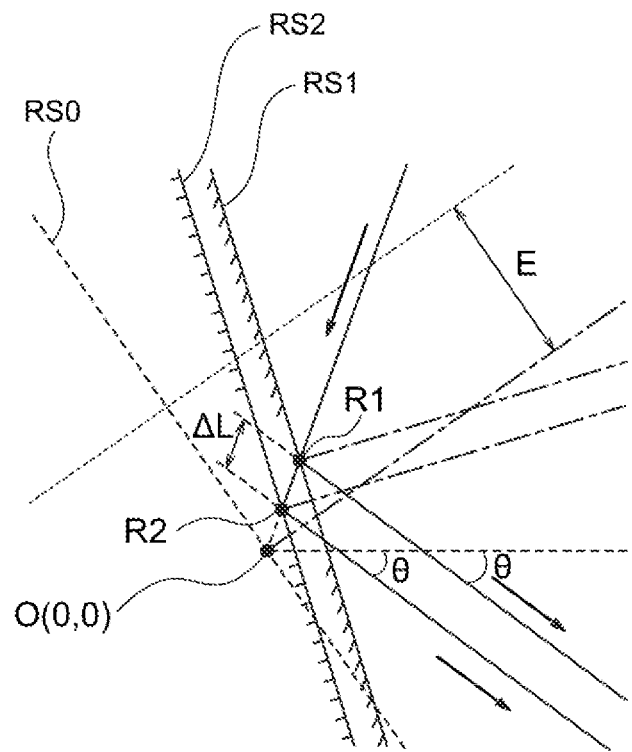
FIG. 4 shows positions of reflecting surfaces and points of reflection of the first polygon mirror and the second polygon mirror in case the angle of deflection is not 0 but θ.

FIG. 4 shows positions of reflecting surfaces and points of reflection of the first polygon mirror 1101 and the second polygon mirror 1102 in case an angle of deflection is not 0 but θ. In case an angle of deflection is 0, the position of a reflecting surface is represented by RS0, and the reference point of deflection is represented by O. In case an angle of deflection is not 0 but θ, a reflecting surface of the first polygon mirror 1101 and that of the second polygon mirror 1102 are represented respectively by RS1 and RS2, the point of reflection on RS1 and that on RS2 are represented respectively by R1 and R2, and the distance between the point R1 and the point R2 is represented by ΔL. In the text of specification, ΔL is referred to as a difference in path length. In case an angle of deflection is not 0 but θ, the path length from the cylindrical lens 107 to the point of reflection of the first optical scanning system is smaller by ΔL than that of the second optical scanning system. Further, in case an angle of deflection is not 0 but θ, the path length from the cylindrical lens 107 to the point of reflection of the first optical scanning system and that of the second optical scanning system are smaller than the path length from the cylindrical lens 107 to the reference point of deflection O. Since the cylindrical lens 107 is designed so as to collect a light beam in the sub-scanning direction at the reference point of deflection in case an angle of deflection is 0, in case an angle of deflection is not 0 but θ, on the path of each of the first and second optical scanning systems, the image point of the optical system for receiving light is located closer to the scanned surface 130 than the reflecting surface. Further, the image point of the optical system for receiving light of the first optical scanning system is located closer to the scanned surface 130 than the image point of the optical system for receiving light of the second optical scanning system.

Figure 5:
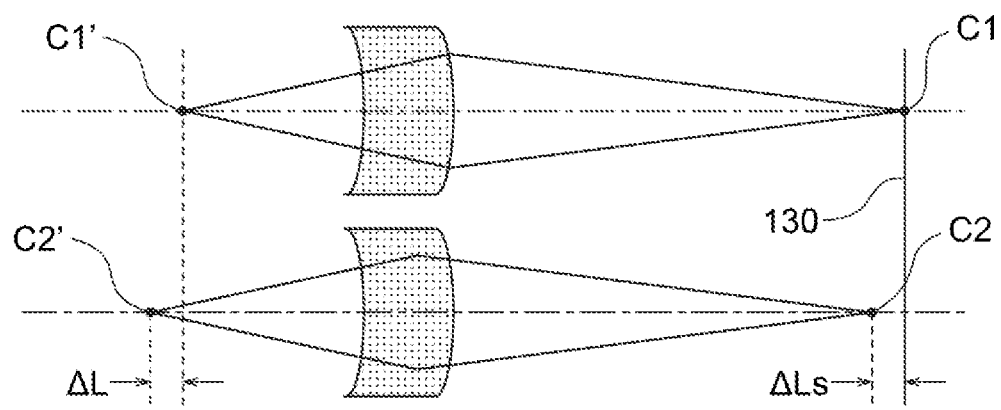
FIG. 5 shows a cross section in the sub-scanning direction of the first optical scanning system and that of the second optical scanning system.

FIG. 5 shows a cross section in the sub-scanning direction of the first optical scanning system and that of the second optical scanning system. In FIG. 5, the image point of the optical system for receiving light of the first optical scanning system and that of the second optical scanning system are represented respectively by C1' and C2', and the image point of the imaging optical system of the first optical scanning system and that of the second optical scanning system are represented respectively by C1 and C2. The image point C1 and the image point C1' are conjugate points, and the image point C2 and the image point C2' are conjugate points. As described above, the first optical scanning system is designed such that curvature of field is substantially negligible. Accordingly, in FIG. 5, the image point C1 of the imaging optical system of the first optical scanning system is located substantially on the scanned surface 130. As described above, the image point C1' of the optical system for receiving light of the first optical scanning system is located closer to the scanned surface 130 than the image point C2' of the optical system for receiving light of the second optical scanning system, and therefore the image point C2 of the imaging optical system of the second optical scanning system is located closer to the optical system for receiving light than the image point C1 of the imaging optical system of the first optical scanning system.

The distance along the optical path from the image point C2 to the scanned surface 130 in the second optical scanning system in case an angle of deflection is not 0 but θ is represented by ΔLs. ΔLs corresponds to a difference between an amount of curvature of field of the second optical scanning system and an amount of curvature of field of the first optical scanning system in a cross section in the sub-scanning direction. In the text of specification, ΔLs is referred to as an amount of change in curvature of field. According to FIG. 4, in case an angle of deflection is not 0 but θ, the distance along the optical path between the image point C1' and the image point C2' of each optical system for receiving light is (ΔL×2) in case an angle of deflection is positive and is ΔL in case an angle of deflection is negative. Accordingly, the following relationships hold.

In case an angle of deflection is positive;

$$\Delta Ls = (\Delta L \times 2) \times \beta^2 \quad (7)$$

In case an angle of deflection is negative:

$$\Delta Ls = \Delta L \times \beta^2 \quad (8)$$

ß represents a lateral magnification in a cross section in the sub-scanning direction of the scanning lens 120.

According to Expressions (7) and (8), the amount of change in curvature of field ΔLs is proportional to the difference in path length ΔL and the square of the lateral magnification ß.

In the embodiment described above, the position of the reference point of deflection of the first optical scanning system and that of the second optical scanning system agree with each other. The center of rotation O1 of the first polygon mirror 1101 and the center of rotation O2 of the second polygon mirror 1102 lie on the straight line S that is perpendicular to a reflecting surface of the first polygon mirror 1101 when an angle of deflection is 0 and that is at a distance of E from the reference point of deflection. In general, the relationships represented by Expressions (7) and (8) hold provided that the position of the reference point of deflection of the first optical scanning system and that of the second optical scanning system agree with each other, even if the center of rotation O1 of the first polygon mirror 1101 and the center of rotation O2 of the second polygon mirror 1102 do not lie on the straight line S.

In a cross section in the main-scanning direction, the light emitting point of the light source 101 and the image point of the imaging optical system are conjugate points. Accordingly, an amount of change in the position of the image point of the imaging optical system due to a difference in path length between the first optical scanning system and that of the second optical scanning system in a cross section in the main-scanning direction is negligible as compared with that in a cross section in the sub-scanning direction.

In step S1030 of FIG. 2, the shape and the position of the scanning lens 120 are adjusted so as to adjust the lateral magnification ß in a cross section in the sub-scanning direction of the imaging optical system. As described above, the amount of change in curvature of field ΔLs in a cross section in the sub-scanning direction depends on the difference in path length ΔL between the first optical scanning system and that of the second optical scanning system and the lateral magnification ß in a cross section in the sub-scanning direction of the imaging optical system. Further, the first optical scanning system is designed such that the curvature of field is negligible. Accordingly, the curvature of field in the sub-scanning direction of the second optical scanning system can be kept smaller than a predetermined value by reducing the lateral magnification ß in a cross section in the sub-scanning direction of the imaging optical system such that the amount of change in curvature of field ΔLs is kept smaller than a predetermined value. In order to adjust the lateral magnification ß in a cross section in the sub-scanning direction of the imaging optical system, the shape and the position of the scanning lens 120 are adjusted. When the lateral magnification ß in a cross section in the sub-scanning direction of the imaging optical system is reduced, a distance between the scanning lens 120 and the image point of the optical system for receiving light should be increased. Accordingly, the scanning lens should be enlarged in the y-axis direction (the main-scanning direction).

Examples of optical scanning systems according to the present invention will be described below. The light-receiving surface and the light-exiting surface of the scanning lens 120 of the examples are expressed by the following expressions.

$$z = \frac{\frac{y^2}{R_y}}{1 + \sqrt{1 - (1+k)\frac{y^2}{R_y^2}}} + \sum_{i=1}^{N} A_i y^i + \frac{\frac{x^2}{r_x(y)}}{1 + \sqrt{1 - \frac{x^2}{r_x(y)^2}}}$$

where $$r_x(y) = r_x(0) + \sum_{i=1}^{N} B_i y^i$$

Symbols representing variables and constants in the expressions are given below.

y: coordinate in the main-scanning direction
x: coordinate in the sub-scanning direction
z: sag (with respect to the origin at the vertex of a lens surface)
k: constant of the cone
Ry: radius of curvature in a cross section in the main-scanning direction
rx (y): radius of curvature in a cross section in the sub-scanning direction at y of coordinate in the main-scanning direction
rx (0): radius of curvature in a cross section in the sub-scanning direction on the optical axis
Ai: aspherical coefficients in a cross section in the main-scanning direction (i=1, 2, 3, 4, . . . )
Bi: coefficients for determining radius of curvature in a cross section in the sub-scanning direction (i=1, 2, 3, 4, . . . )

The light source 101 is a laser diode. In the tables given below,
θ⊥
represents a beam divergence angle in the direction perpendicular to the bonded surfaces of the laser diode, and
θ//
represents a beam divergence angle parallel thereto. The material of the scanning lens 120 is a polycycloolefin resin, refractive index of which is 1.503.

Example 1

Table 1 gives data of the optical layout and optical elements and data representing the shape of each surface of the scanning lens in the optical scanning systems of Example 1. The first optical scanning system and the second optical scanning system are identical with each other except for the effective scanning width and the size and position of the polygon mirror.

TABLE 1

| | | | Example 1 | | | | |
|---|---|---|---|---|---|---|---|
| Item | | Unit | 1st optical scanning system | 2nd optical scanning system | | Coefficients of light receiving surface | Coefficients of light exiting surface |
| Effective scanning width W | | mm | 330 | 310 | | | |
| System focal length f | | mm | 260 | | Ry | 128.80589 | 378.90454 |
| Laser diode light source | Wavelength | nm | 780 | | k | −5.66523 | 2.64152 |
| | θ⊥ | deg | 30 | | A1 | 0 | 7.39109E−04 |
| | θ// | deg | 10 | | A2 | −4.07654E−05 | −5.84722E−04 |
| Collimator lens | Focal length | mm | 32 | | A3 | 0 | −1.06633E−07 |
| | Center thickness | mm | 2.50 | | A4 | −7.22102E−07 | −6.59264E−07 |
| Aperture stop (Ellipse) | Main-scanning direction | mm | 5.84 | | A5 | 0 | −5.49158E−11 |
| | Sub-scanning direction | mm | 4.84 | | A6 | 1.01512E−10 | 1.70343E−11 |
| Cylindrical lens | Focal length | mm | 80 | | A7 | 0 | 2.06786E−14 |
| | Center thickness | mm | 3 | | A8 | −4.83079E−15 | 5.74455E−15 |
| Deflector (Polygon mirror) | Number of faces | — | 6 | | A9 | 0 | −2.13000E−18 |
| | Size | mm | Inscribed circle φ36 | Circumscribed circle φ30 | A10 | −1.27348E−19 | −5.20533E−19 |
| | Amount of shift of center of rotation E | mm | 2.0 | 2.0 | rx0 | −39.83008 | −18.45929 |
| | Y coordinate of center | mm | −8.686 | −5.813 | B1 | 5.73570E−03 | 3.02373E−03 |
| | Z coordinate of center | mm | −15.892 | −11.788 | B2 | −5.16356E−02 | −6.82984E−03 |

TABLE 1-continued

| Item | | Unit | Example 1 1st optical scanning system | Example 1 2nd optical scanning system | | Coefficients of light receiving surface | Coefficients of light exiting surface |
|---|---|---|---|---|---|---|---|
| Scanning lens | Center thickness | mm | 13 | | B3 | −1.22539E−04 | −1.00199E−05 |
| | Refractive index | — | 1.5036 | | B4 | −3.59032E−06 | 2.31794E−06 |
| | Length of scanning lens | mm | 110 | | B5 | 1.40791E−07 | 1.75193E−08 |
| Light source-reference point of deflection | | mm | 121.86 | | B6 | −121407E−08 | −130142E−09 |
| Light-exiting surface of collimator lens-reference point of deflection | | mm | 88 | | B7 | −2.62636E−11 | −6.40177E−12 |
| Aperture stop-reference point of deflection | | mm | 83 | | B8 | 2.26655E−12 | 3.41393E−13 |
| Light-exiting surface of cylindrical lens-reference point of deflection | | mm | 73.092 | | B9 | 4.15392E−14 | 6.18046E−16 |
| Reference point of deflection-light receiving surface of scanning lens | | mm | 61.868 | | B10 | −4.01376E−15 | −2.32351E−17 |
| Reference point of deflection-Scanned surface | | mm | 310.283 | | | | |
| Incidence angle of principal ray onto deflector | | deg | 70 | | | | |

Example 2

Table 2 gives data of the optical layout and optical elements and data representing the shape of each surface of the scanning lens in the optical scanning systems of Example 2. The first optical scanning system and the second optical scanning system are identical with each other except for the effective scanning width and the size and position of the polygon mirror.

TABLE 2

| Item | | Unit | Example 2 1st optical scanning system | Example 2 2nd optical scanning system | | Coefficients of light receiving surface | Coefficients of light exiting surface |
|---|---|---|---|---|---|---|---|
| Effective scanning width W | | mm | 330 | 310 | | | |
| System focal length f | | mm | 260 | | Ry | 118.69300 | 258.94491 |
| Laser diode light source | Wavelength | nm | 780 | | k | −3.55317 | −1.14762 |
| | θ⊥ | deg | 30 | | A1 | 0 | −3.88911E−04 |
| | θ// | deg | 10 | | A2 | 3.30079E−05 | −2.93502E−04 |
| Collimator lens | Focal length | mm | 32 | | A3 | 0 | −1.55288E−07 |
| | Center thickness | mm | 2.50 | | A4 | −7.32092E−07 | −6.54275E−07 |
| Aperture stop (Ellipse) | Main-scanning direction | mm | 6.14 | | A5 | 0 | −3.58398E−11 |
| | Sub-scanning direction | mm | 3.92 | | A6 | 9.81867E−11 | 2.89006E−11 |
| Cylindrical lens | Focal length | mm | 80 | | A7 | 0 | 9.88232E−15 |
| | Center thickness | mm | 3 | | A8 | −6.46872E−15 | 2.99261E−15 |
| Deflector (Polygon mirror) | Number of faces | — | 6 | | A9 | 0 | −8.37564E−19 |
| | Size | mm | Inscribed circle φ36 | Circumscribed circle φ30 | A10 | 3.91891E−20 | −5.21541E−19 |
| | Amount of shift of center of rotation E | mm | 2.0 | 2.0 | rx0 | −32.21869 | −17.60637 |
| | Y coordinate of center | mm | −8.686 | −5.813 | B1 | 2.20501E−02 | 5.64276E−03 |
| | Z coordinate of center | mm | −15.892 | −11.788 | B2 | −3.78021E−02 | −6.81297E−03 |
| Scanning lens | Center thickness | mm | 13 | | B3 | −7.90701E−05 | −1.00237E−05 |
| | Refractive index | — | 1.5036 | | B4 | 2.21071E−06 | 2.31546E−06 |
| | Length of scanning lens | mm | 120 | | B5 | 1.53064E−07 | 1.75956E−08 |

TABLE 2-continued

| Item | Unit | Example 2 | | | Coefficients of light receiving surface | Coefficients of light exiting surface |
|---|---|---|---|---|---|---|
| | | 1st optical scanning system | 2nd optical scanning system | | | |
| Light source-reference point of deflection | mm | 122.347 | | B6 | −1.01695E−08 | −1.33419E−09 |
| Light-exiting surface of collimator lens-reference point of deflection | mm | 88 | | B7 | −6.10488E−11 | −6.31575E−12 |
| Aperture stop-reference point of deflection | mm | 83 | | B8 | 2.72116E−12 | 3.32185E−13 |
| Light-exiting surface of cylindrical lens-reference point of deflection | mm | 70.47 | | B9 | 3.55713E−14 | 6.33467E−16 |
| Reference point of deflection-light receiving surface of scanning lens | mm | 67.14 | | B10 | −1.91888E−15 | −2.42854E−17 |
| Reference point of deflection-Scanned surface | mm | 303.011 | | | | |
| Incidence angle of principal ray onto deflector | deg | 70 | | | | |

Example 3

Table 3 gives data of the optical layout and optical elements and data representing the shape of each surface of the scanning lens in the optical scanning systems of Example 3. The first optical scanning system and the second optical scanning system are identical with each other except for the effective scanning width and the size and position of the polygon mirror.

TABLE 3

| Item | | Unit | Example 3 | | | Coefficients of light receiving surface | Coefficients of light exiting surface |
|---|---|---|---|---|---|---|---|
| | | | 1st optical scanning system | 2nd optical scanning system | | | |
| Effective scanning width W | | mm | 330 | 310 | | | |
| System focal length f | | mm | 260 | | Ry | 123.80648 | 319.50290 |
| Laser diode light source | Wavelength | nm | 780 | | k | −2.46695 | 10.00004 |
| | θ⊥ | deg | 30 | | A1 | 0 | −1.52881E−03 |
| | θ// | deg | 10 | | A2 | 1.90752E−05 | 1.76058E−04 |
| Collimator lens | Focal length | mm | 32 | | A3 | 0 | −1.00385E−07 |
| | Center thickness | mm | 2.50 | | A4 | −7.08138E−07 | −6.26572E−07 |
| Aperture stop (Ellipse) | Main-scanning direction | mm | 6.3 | | A5 | 0 | −7.79138E−11 |
| | Sub-scanning direction | mm | 3.46 | | A6 | 8.97731E−11 | 2.01931E−11 |
| Cylindrical lens | Focal length | mm | 80 | | A7 | 0 | 2.01021E−14 |
| | Center thickness | mm | 3 | | A8 | −6.70602E−15 | 3.52660E−15 |
| Deflector (Polygon mirror) | Number of faces | — | 6 | | A9 | 0 | −2.04540E−18 |
| | Size | mm | Inscribed circle φ36 | Circumscribed circle φ30 | A10 | −1.56083E−20 | −7.86295E−19 |
| | Amount of shift of center of rotation E | mm | 2.0 | 2.0 | rx0 | −51.97833 | −21.32786 |
| | Y coordinate of center | mm | −8.686 | −5.813 | B1 | 3.22726E−02 | 5.94739E−03 |
| | Z coordinate of center | mm | −15.892 | −11.788 | B2 | −5.99723E−02 | −6.92666E−03 |
| Scanning lens | Center thickness | mm | 15 | | B3 | −1.35477E−04 | −1.03474E−05 |
| | Refractive index | — | 1.5036 | | B4 | −1.53167E−05 | 1.10419E−06 |
| | Length of scanning lens | mm | 130 | | B5 | 1.14837E−07 | 1.16765E−08 |
| Light source-reference point of deflection | | mm | 122.628 | | B6 | −1.21661E−08 | 7.52383E−11 |
| Light-exiting surface of collimator lens-reference point of deflection | | mm | 88 | | B7 | −4.10823E−11 | −3.20023E−12 |
| Aperture stop-reference point of deflection | | mm | 83 | | B8 | 8.63264E−12 | −8.39239E−14 |
| Light-exiting surface of cylindrical lens-reference point of deflection | | mm | 69.091 | | B9 | 4.50448E−14 | 2.44962E−16 |

TABLE 3-continued

| | | Example 3 | | | |
|---|---|---|---|---|---|
| Item | Unit | 1st optical scanning system | 2nd optical scanning system | Coefficients of light receiving surface | Coefficients of light exiting surface |
| Reference point of deflection-light receiving surface of scanning lens | mm | 73.172 | | B10  −3.26446E−15 | 1.26486E−17 |
| Reference point of deflection-Scanned surface | mm | 300.697 | | | |
| Incidence angle of principal ray onto deflector | deg | 70 | | | |

Summary of the Examples

Table 4 shows features of Examples 1-3. In Table 4, f represents system focal length, each of W1 and W2 represents effective scanning width of each of the first and second scanning optical systems, each of φ1 and φ2 represents diameter of the inscribed circle of each of the first and second polygon mirrors, ß represents a lateral magnification in a cross section in the sub-scanning direction of the imaging optical system, and ΔD represents the maximum absolute value of amount of change in curvature of field. A circumscribed circle with a diameter of 30 millimeters shown in Tables 1-3 corresponds to an inscribed circle with a diameter of 25.98 millimeters.

TABLE 4

| | Example 1 | Example 2 | Example 3 |
|---|---|---|---|
| f/W1 | 0.79 | 0.79 | 0.79 |
| f/W2 | 0.84 | 0.84 | 0.84 |
| Φ2/Φ1 | 0.72 | 0.72 | 0.72 |
| ß | 3.07 | 2.66 | 2.40 |
| ΔD (mm) | 3.63 | 2.74 | 2.06 |
| W2 (mm) | 300 | 300 | 300 |

According to Table 4, Expressions (1)-(6) are satisfied in Examples 1-3.

Figure 6:
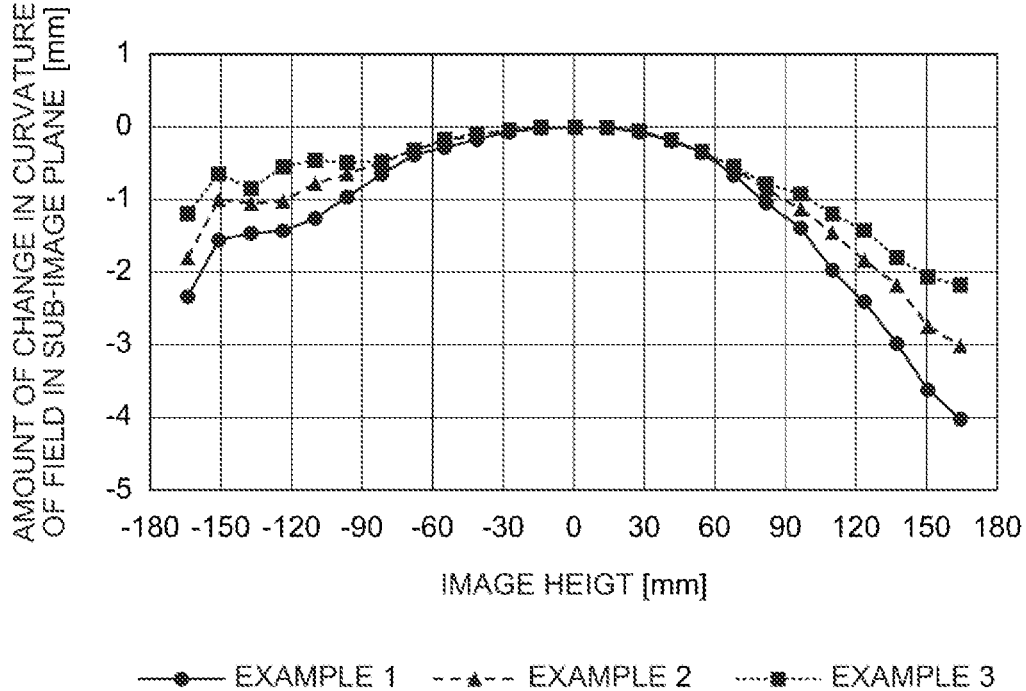
FIG. 6 shows relationships between image height and amount of change in curvature of field in a cross section in the sub-scanning direction of Examples 1-3.

FIG. 6 shows relationships between image height and amount of change in curvature of field in a cross section in the sub-scanning direction of Examples 1-3. The horizontal axis of FIG. 6 indicates image height, and the vertical axis of FIG. 6 indicates amount of change in curvature of field in a cross section in the sub-scanning direction. The unit of each of the horizontal axis and the vertical axis is millimeter. As shown in FIG. 5, the image point C2 is located closer to the optical system for receiving light than the image point C1, and therefore the amount of change in curvature of field is represented by negative values in FIG. 6.

Figure 7:
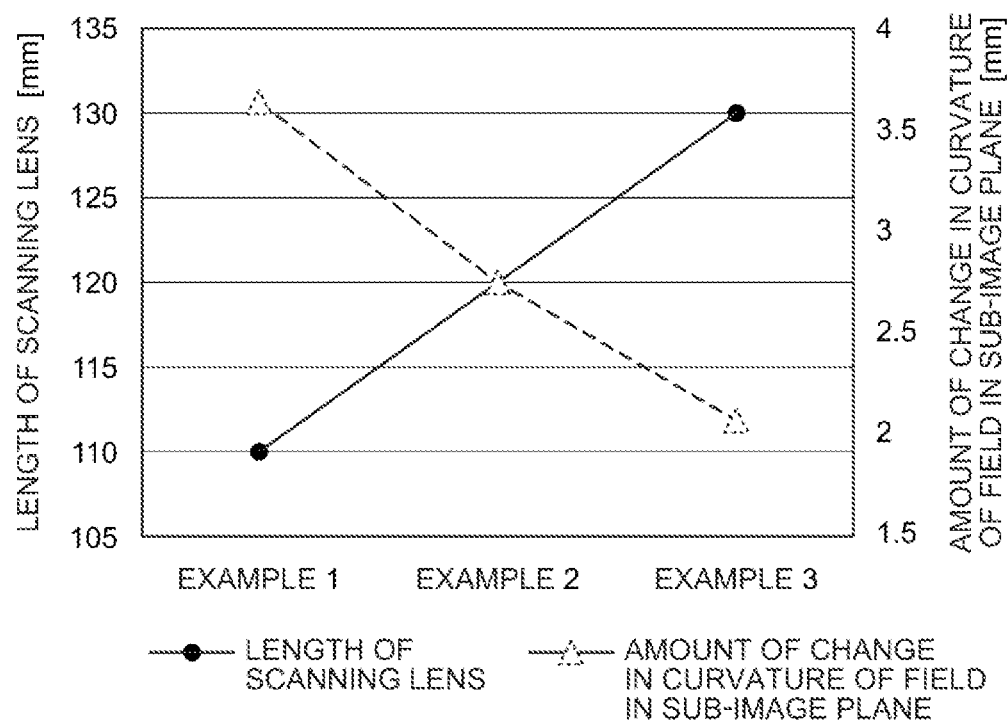
FIG. 7 shows the maximum absolute values of amount of change in curvature of field in a cross section in the sub-scanning direction and values of length in the main-scanning direction of the scanning lenses of Examples 1-3.

FIG. 7 shows the maximum absolute values of amount of change in curvature of field in a cross section in the sub-scanning direction within the effective scanning width of 310 millimeters and values of length in the main-scanning direction of the scanning lenses of Examples 1-3. As described above, by reducing the lateral magnification ß in a cross section in the sub-scanning direction of the imaging optical system, the maximum absolute value of amount of change in curvature of field in a cross section in the sub-scanning direction can be reduced. In this case, however, a distance between the polygon mirror and the scanning lens should be made greater, and thus the length in the main-scanning direction of the scanning lens should be made greater. Accordingly, the lateral magnification ß should be determined by weighing up reduction in the absolute value of amount of change in curvature of field obtained by reducing the lateral magnification ß against increase in the manufacturing cost caused by a greater size of the scanning lens.

What is claimed is:

1. A method for manufacturing scanning optical systems, by which the scanning optical systems with different effective scanning widths can be obtained by changing a polygon mirror alone without changing an imaging optical system including a scanning lens and an optical system for receiving light, the method comprising the steps of:

designing a first scanning optical system using a first polygon mirror corresponding to a first value of effective scanning width;

designing a second scanning optical system provided with a second polygon mirror corresponding to a second value of effective scanning width, the second value being smaller than the first value, wherein a reference point of deflection is located at a position of the reference point of deflection of the first scanning optical system, the reference point of deflection being a point of reflection on a reflecting surface of a ray of light when an angle of deflection of a reflected ray is 0; and adjusting a size and a position of the scanning lens so as to adjust a lateral magnification in a cross section in a sub-scanning direction of the imaging optical system.

2. The method for manufacturing scanning optical systems according to claim 1, wherein in the step of designing the second scanning optical system, a center of the second polygon mirror is located on a straight line that is perpendicular to a reflecting surface of the first polygon mirror when the angle of deflection is 0 and that passes through a center of the first polygon mirror.

3. The method for manufacturing scanning optical systems according to claim 1, wherein relationships $$0.75 \leq f/W1 \leq 0.85 \quad (1)$$

$$0.75 \leq f/W2 \leq 0.85 \quad (2)$$

$$0.7 \leq \phi2/\phi1 \leq 0.8 \quad (3)$$

and $$2.4 \leq \beta \leq 3.2 \quad (4)$$

hold, where f represents a system focal length, W1 represents the first value, W2 represents the second value, φ1 represents a diameter of an inscribed circle of the first polygon mirror, φ2 represents a diameter of an inscribed circle of the second polygon mirror, and β represents the lateral magnification in the cross section in the sub-scanning direction of the imaging optical system.

4. The method for manufacturing scanning optical systems according to claim 1, wherein in the step of adjusting a size and a position of the scanning lens so as to adjust the lateral magnification in the cross section in the sub-scanning direction of the imaging optical system, the lateral magnification is adjusted such that a relationship $$0 \leq |\Delta D| \leq 4.35 \text{ mm} \quad (5)$$

holds, where $$|\Delta D|$$

represents a maximum absolute value of difference between an amount of curvature of field of a first optical scanning system in the cross section in the sub-scanning direction and an amount of curvature of field of a second optical scanning system in the cross section in the sub-scanning direction.

5. The method for manufacturing scanning optical systems according to claim 1, wherein a relationship $$300 \text{ mm} \leq W2 \quad (6)$$

holds where W2 represents the second value.

* * * * *